United States Patent [19]

Mitsuhira et al.

[11] Patent Number: 5,235,682
[45] Date of Patent: Aug. 10, 1993

[54] PORT OUTPUT CONTROLLER FOR USE IN MICROCOMPUTER

[75] Inventors: Yuko Mitsuhira; Tsuyoshi Katayose, both of Tokyo, Japan

[73] Assignee: NEC Corporation, Tokyo, Japan

[21] Appl. No.: 783,756

[22] Filed: Oct. 17, 1991

[30] Foreign Application Priority Data

Oct. 17, 1990 [JP] Japan .................................. 2-278274

[51] Int. Cl.⁵ .............................................. G06F 13/00
[52] U.S. Cl. .................................................... 395/275
[58] Field of Search ... 364/200 MS File, 900 MS File; 395/550, 275, 250

[56] References Cited

U.S. PATENT DOCUMENTS

| | | | |
|---|---|---|---|
| 4,007,448 | 2/1977 | Sergeant et al. | 395/325 |
| 4,079,456 | 3/1978 | Lunsford et al. | 395/550 |
| 4,279,015 | 7/1981 | Edelman et al. | 395/550 |
| 4,785,415 | 11/1988 | Karlquist . | |

FOREIGN PATENT DOCUMENTS 0160896 4/1985 European Pat. Off. .
0373693 12/1989 European Pat. Off. .
0391574 3/1990 European Pat. Off. .

OTHER PUBLICATIONS

Elektronik, vol. 36, No. 22, Oct. 30, 1987, Munchen DE pp. 94-96, H. Sax. Motorbrucke mit hohem Wirkungsgrad.

Primary Examiner—Dale M. Shaw
Assistant Examiner—Lance L. Barry
Attorney, Agent, or Firm—Whitham & Marhoefer

[57] ABSTRACT

A port output controller for use in a microcomputer for outputting data to a plurality of output terminals in real time, includes a latch circuit for latching data being outputted to the output terminals and a buffer register for storing data to be outputted to the output terminals next to the data being outputted to the output terminals. A timer counter counts an elapsed time after the next data has been latched in the latch circuit and causes the next data stored in the buffer register to be latched into the latch circuit when the counted elapsed time becomes a predetermined data outputting period of time. In a delayed output mode, a delay counter counts a delayed time after the next data has been latched in the latch circuit, and a delay output circuit controls the outputting of the data latched in the latch circuit to the output terminals in such a manner that if the data latched in the latch circuit is a first value, the data latched in the latch circuit is outputted to the output terminal without delay, and if the data latched in the latch circuit is a second value, the data latched in the latch circuit is outputted to the output terminal when the counted delay time has become a predetermined delay time.

4 Claims, 5 Drawing Sheets

PORT OUTPUT CONTROLLER FOR USE IN MICROCOMPUTER

BACKGROUND OF THE INVENTION

1. Field of the Invention

The present invention relates to a microcomputer for controlling real time output, and more specifically to a port output controller for use in such a microcomputer.

2. Description of related art

Microcomputers include one type of microcomputer including a peripheral circuit therein, which is called a "single chip microcomputer" or a "one-chip microcomputer". The peripheral circuit includes an interrupt controller, a direct memory access (DMA) controller, a timer, a serial interface, etc., which are used for control of various systems.

One of these single chip microcomputers includes a peripheral circuit, called a "port output controller", for controlling an output to output terminals (called a "port" hereinafter) externally supplying a waveform used for controlling a motor included in a printer or a facsimile.

This type of single chip microcomputer includes a CPU (central processing unit), an interrupt controller and a port output controller for outputting values of buffer registers to an output port every designated time. The port output controller includes an output latch circuit for latching and outputting data to the output port, and a buffer register receiving data through an internal bus under control of the CPU for temporarily storing data to be outputted to the output port next to the data that is latched in the output latch circuit and therefore is being outputted to the output port. When a predetermined length of time has elapsed after the data is latched into d~e output latch circuit, a timing controller controls to update the output latch circuit, namely, to cause the output latch circuit to latch the data temporarily stored in the buffer register.

Here, assume that the port output controller of the above mentioned microcomputer has six ports, and the above mentioned microcomputer is used for controlling a motor by using an output waveform obtained at the six ports, as a three-phase inverter motor driving waveform. Furthermore, assume that the first, second and third ports define non-inverted waveforms of three phases (U-phase, V-phase and W-phase), respectively, and the fourth, fifth and sixth ports define inverted waveforms of the three phases (U*-phase, V*-phase and W*-phase), respectively.

When the microcomputer operates under the above mentioned assumption, it is in some cases that all the ports do not simultaneously change at a port output changing timing. For example, the U-phase (first port) and the U*-phase must simultaneously change. However, when the U-phase (first port) changes from "0" to "1", the U*-phase (fourth port) often changes from "1" to "0" with a delay, due to various differences within the port output controller, such as difference in length of control lines, variation in characteristics of latches, and difference in length of signal lines from the latches to the ports. As a result, the U-phase (first port) and the U*-phase (fourth port) simultaneously become "0" for a momentary period. During this momentary period, a pass-trough current flows through the motor. This is an important problem in control of the motor.

This is also an important problem in the case of controlling a reversible DC motor, since a pass-through current similarly flows when a pair of opposing phases as mentioned above momentarily simultaneously become "0". On the other hand, in the control of a stepping motor, if each pair of opposing phases simultaneously become "1", vibration occurs in a driving magnetic force.

As mentioned above, the conventional port output controller of the microcomputer is not satisfactory in controlling the motor, since the above mentioned problems have been encountered.

SUMMARY OF THE INVENTION

Accordingly, it is an object of the present invention to provide a port output controller of the microcomputer which has overcome the above mentioned defect of the conventional one.

Another object of the present invention is to provide a port output controller of the microcomputer, capable of preventing the pass-through current and the vibration of the driving magnetic force.

The above and other objects of the present invention are achieved in accordance with the present invention by a port output controller for use in a microcomputer for outputting data to a plurality of output terminals in real time, comprising:

a plurality of output terminals for externally outputting data;

means for holding data being outputted to the output terminals;

means for storing data to be outputted to the output terminals next to the data being outputted to the output terminals;

means for measuring an elapsed time after the next data is stored in the data holding means and for causing the next data stored in the data storing means to be written to the data holding means when the measured elapsed time becomes a first predetermined time;

means for designating either a first mode in which after the data stored in the data storing means has been written to the data holding means, the data held in the data holding means is outputted to the output terminals without delay, or a second mode in which after the data stored in the data storing means has been written to the data holding means, the data held in the data holding means is outputted to the output terminals with a delay time; and means for measuring a delayed time after the next data stored in the data storing means has been written to thee data holding means and for controlling the outputting of the data held in the data holding means to the output terminals when the second mode is designated by the mode designating means, in such a manner that if the data written to the data holding means is a first value, the data held in the data holding means is outputted to the output terminal without delay, and if the data written to the data holding means is a second value, the data held in the data holding means is outputted to the output terminal when the measured delayed time has become a second predetermined value.

The above and other objects, features and advantages of the present invention will be apparent from the following description of preferred embodiments the invention with reference to the accompanying drawings.

DESCRIPTION OF THE PREFERRED EMBODIMENTS

Figure 1:
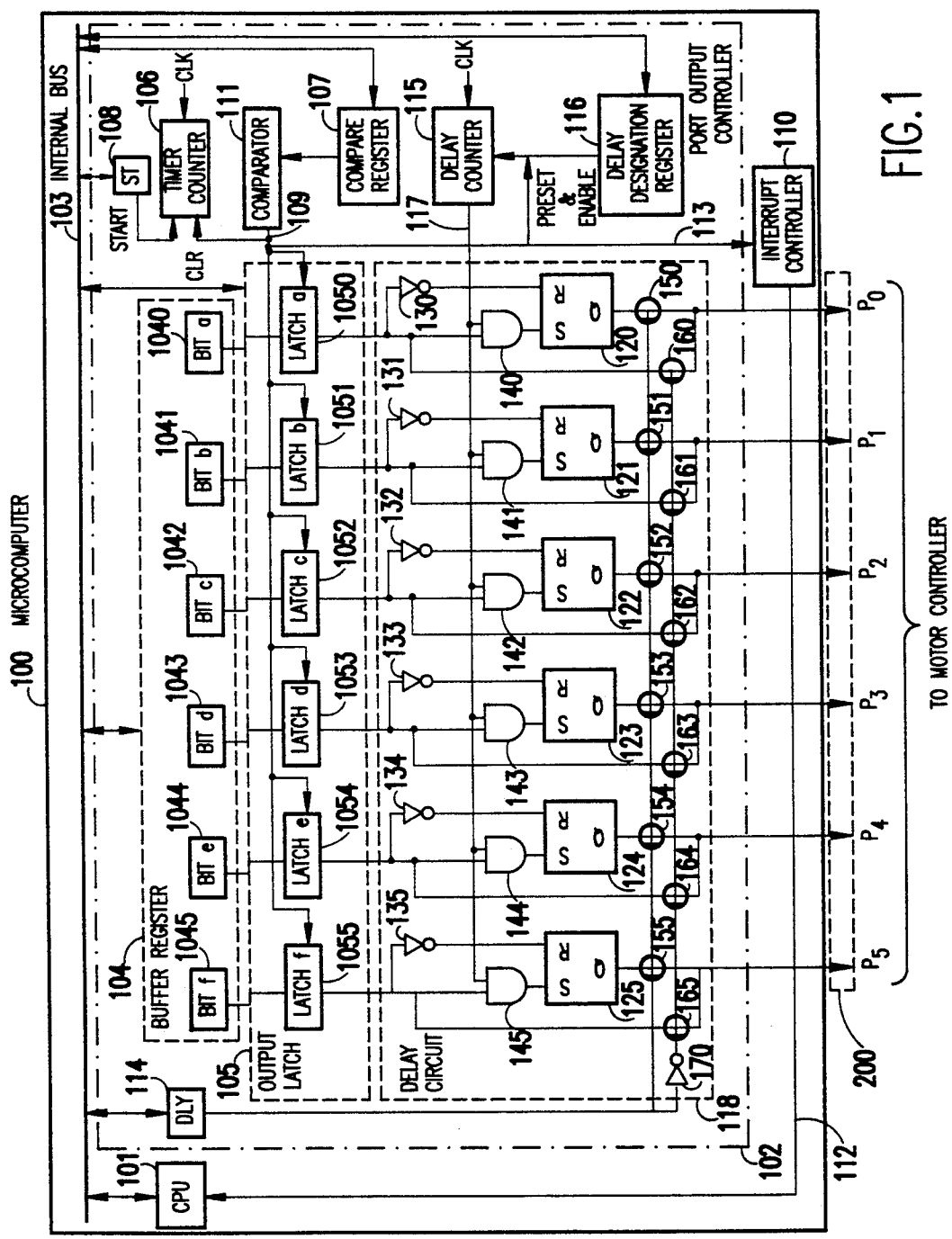
FIG. 1 is a block diagram of the microcomputer having a first embodiment of the port output controller in accordance with the present invention.

Referring to FIG. 1, there is shown a block diagram of the microcomputer having a first embodiment of the port output controller in accordance with the present invention.

The shown microcomputer, designated generally by Reference Numeral 100, comprises a CPU (central processing unit) 101, an interrupt controller 110 and a port output controller 102 for outputting values of buffer registers to an output port 200 every designated time. The CPU 101, the interrupt controller 110 and the port output controller 102 are coupled to each other by an internal bus 103 or other connection lines, as shown in FIG. 1.

The port output controller 102 includes a buffer register 104 for storing data to be outputted to the output port 200 next to data that is being outputted to the output port 200, and an output latch circuit 105 for holding data that is being outputted to the output port 200. The port output controller 102 also includes a timer counter 106 receiving an internal clock CLK for counting a time interval after which the output latch circuit 105 latches data stored in the buffer register 104, a compare register 107 for designating the above mentioned time interval, and a comparator 111 for comparing a value of the timer counter 106 with a value of the compare register 107 so as to generate a coincidence signal 109. The port output controller 102 further includes a timer counter start bit ST 108 for causing the timer counter 106 to start its counting operation, a delay designating bit DLY 114 for designating a delayed output mode in which the data latched in the output latch circuit 105 is outputted to the output port 200 at a delayed timing. In addition, the port output controller 102 includes a delay counter 115 receiving the internal clock CLK for counting a delayed time so as to generate a coincidence signal 117, a delay designating register 116 for previously designating a length of the delayed time, and a delay circuit 118 for causing the data latched in the output latch circuit 105 to be outputted to the output port 200 at a delayed timing when latch of the output latch circuit 105 holds the value of "1".

In the shown example, the output port 200 includes six ports P0, P1, P2, P3, P4 and P5. Therefore, the buffer register 104 correspondingly includes six register stages 1040 to 1045 composed of a bit "a", a bit "b", a bit "c", a bit "d", a bit "e" and a bit "f", which can be registered with a binary data through the internal bus 103. In addition, the output latch circuit 105 correspondingly includes six latches 1050 to 1055 composed of a latch "a", a latch "b", a latch "c", a latch "d", a latch "e" and a latch "f", which have a control input connected to receive the coincidence signal 109 from the comparator 111, respectively. A data input of the latch "a" 1050, the latch "b" 1051, the latch "c" 1052, the latch "d" 1053, the latch "e" 1054 and the latch "f" 1055 is connected to an output of the bit "a" 1040, the bit "b" 1042, the bit "c" 1042, the bit "d" 1043, the bit "e" 1044 and the bit "f" 1045, respectively.

A data output of each of the six latches 1050 to 1055 is connected through a corresponding transfer gate 160, 161, 162, 163, 164 or 165 to a corresponding one of the ports P0 to P5. In addition, the data output of each of the six latches 1050 to 1055 is connected through a corresponding inverter 130, 131, 132, 133, 134 or 135 to a reset input R of a corresponding set/reset flipflop 120, 121, 122, 123, 124 or 125 and also through a corresponding AND gate 140, 141, 142, 143, 144 or 145 to a set input S of the corresponding set/reset flipflop 120, 121, 122, 123, 124 or 125. An output Q of each of the flipflops 120, 121, 122, 123, 124 and 125 is connected through another corresponding transfer gate 150, 151, 152, 153, 154 or 155 to a corresponding one of the ports P0 to P5. The other input of each of the AND gates 140, 141, 142, 143, 144 and 145 is connected to receive the coincidence signal 117 from the delay counter 115. All of the transfer gates 150, 151, 152, 153, 154 and 155 are controlled by an output of the delay designating bit DLY 114, and all of transfer gates 160, 161, 162, 163, 164 and 165 are controlled by an output of an inverter 170 receiving the output of the delay designating bit DLY 114.

Figure 2:
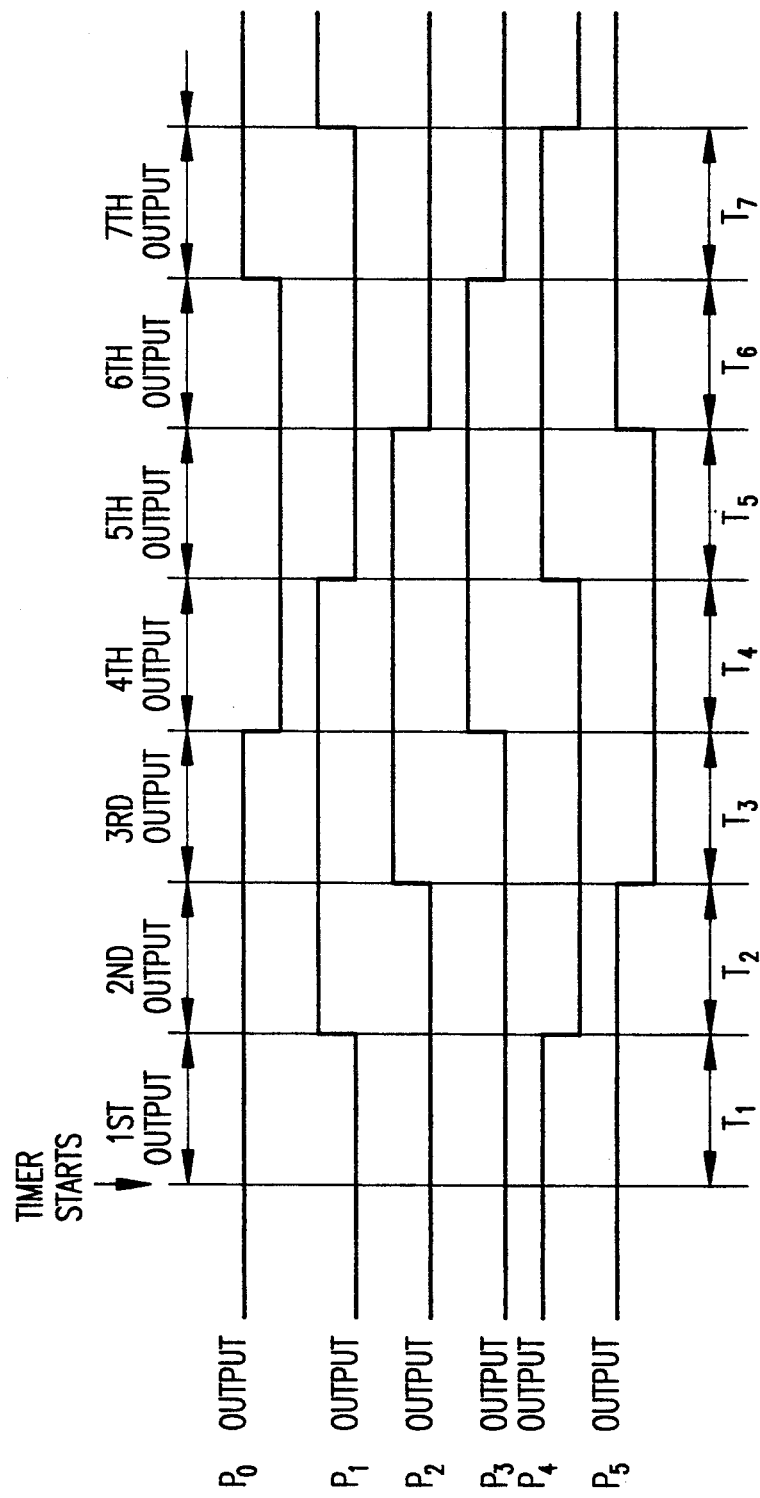
FIGS. 2 and 3 are timing charts illustrating two different operation modes of the port output controller shown in FIG. 1, respectively.

Now, an operation of an undelayed output mode in which the values latched in the output latch circuit 105 are outputted to the output port 200 without delay, will be described with reference to FIG. 2.

In this case, the delay designating bit DLY 114 is set to "0", so that all of the transfer gates 150, 151, 152, 153, 154 and 155 are closed, and all of the transfer gates 160, 161, 162, 163, 164 and 165 are open so as to ensure that the values latched in the output latch circuit 105 are directly outputted to the port 200.

Under control of the CPU 101, output values to be outputted to the ports P0 to P5 at a first time ("100011" in the timing chart of FIG. 2) are previously set in the output latch circuit 105, and output values to be outputted to the ports P0 to P5 at a second time ("110001" in the timing chart of FIG. 2) are previously set in the buffer register 104. Therefore, at this time, the output values to be outputted at the first time set in the output latch circuit 105 are being outputted to the ports P0 to P5.

In addition, the compare register 107 is previously set with a value corresponding to a period of time (T1 in the timing chart of FIG. 2) in which the output values to be outputted to the ports P0 to P5 at the first time continue to be outputted to the ports P0 to P5. Thereafter, the timer counter start bit ST 108 is set to "1", so that the timer counter 106 is caused to start its counting operation.

If the timer counter start bit ST 108 is set to "1", the timer counter 106 is cleared to "0", and thereafter, immediately starts its counting operation so that the timer counter 106 is incremented by "1" in response to a rising edge of each internal clock CLK. The comparator 111 ceaselessly compares the value of the timer counter 106 with the value previously set in the compare register 107. When the value of the timer counter 106 becomes consistent with the value previously set in the compare register 107 by increment of the timer counter 106, the comparator 111 activates the coincidence signal 109.

If the coincidence signal 109 is activated, the values of the buffer register 104 are latched into the output latch circuit 105. Namely, the output values to be outputted at the second time set in the buffer register 104 are latched into the output latch circuit 105, and therefore, immediately outputted to the ports P0 to P5. At the same time, in response to activation of the coincidence signal 109, the value of the timer counter 106 is initialized to "0" so that the timer counter 106 is incremented from "0" in response to each internal clock CLK.

On the other hand, the coincidence signal 109 is supplied as a timer interrupt request signal 113 to the interrupt controller 110. If the interrupt controller 110 detects the activated timer interrupt request signal 113, the interrupt controller 110 outputs an active interrupt request signal 112 to the CPU 101.

If the CPU 101 detects the active interrupt request signal 112, the CPU 101 interrupts a programmed processing being executed, and starts an interrupt program processing. In this interrupt routine, output values to be outputted to the ports P0 to P5 at a third time ("111000" in the timing chart of FIG. 2) are set in the buffer register 104, and the compare register 107 is set with a value corresponding to a period of time (T2 in the timing chart of FIG. 2) in which the output values to be outputted at the second time continue to be outputted to the ports P0 to P5.

Thus, the value set in the compare register 107 by the CPU 101 is compared again with the value of the timer counter 106 by the comparator 106. When the period of time (T2 in the timing chart of FIG. 2) in which the output values to be outputted at the second time continue to be outputted to the output port, has elapsed, the value set in the compare register 107 and the value of the timer counter 106 become consistent, and therefore, the values of the buffer register 104 are latched in the output latch circuit 105, similarly to the above mentioned situation. Since the output values to be outputted at the third time are set in the buffer register 104, the output values to be outputted at the third time are outputted to the ports P0 to P5 after the period of time T2 for continuing to output the output values to be outputted at the second time has elapsed.

The above mentioned operation is repeatedly executed. Therefore, when the period of time for continuing to output values to be outputted to an (n)th time has elapsed, the active coincidence signal 109 is generated, and output values to be outputted at an (n+1)th time are latched in the output latch circuit 108, and outputted to the output port 200 without delay and regardless of the values outputted to the port. In the interrupt routine triggered by the active coincidence signal 109, output values to be outputted at an (n+2)th time are set in the buffer register 104, and a value corresponding to the period of time for continuing to output the output values to be outputted at the (n+1)th time is set in the compare register 107. Thus, port output values are updated every arbitrarily designated period of time, and then, outputted to the output port.

Figure 3:
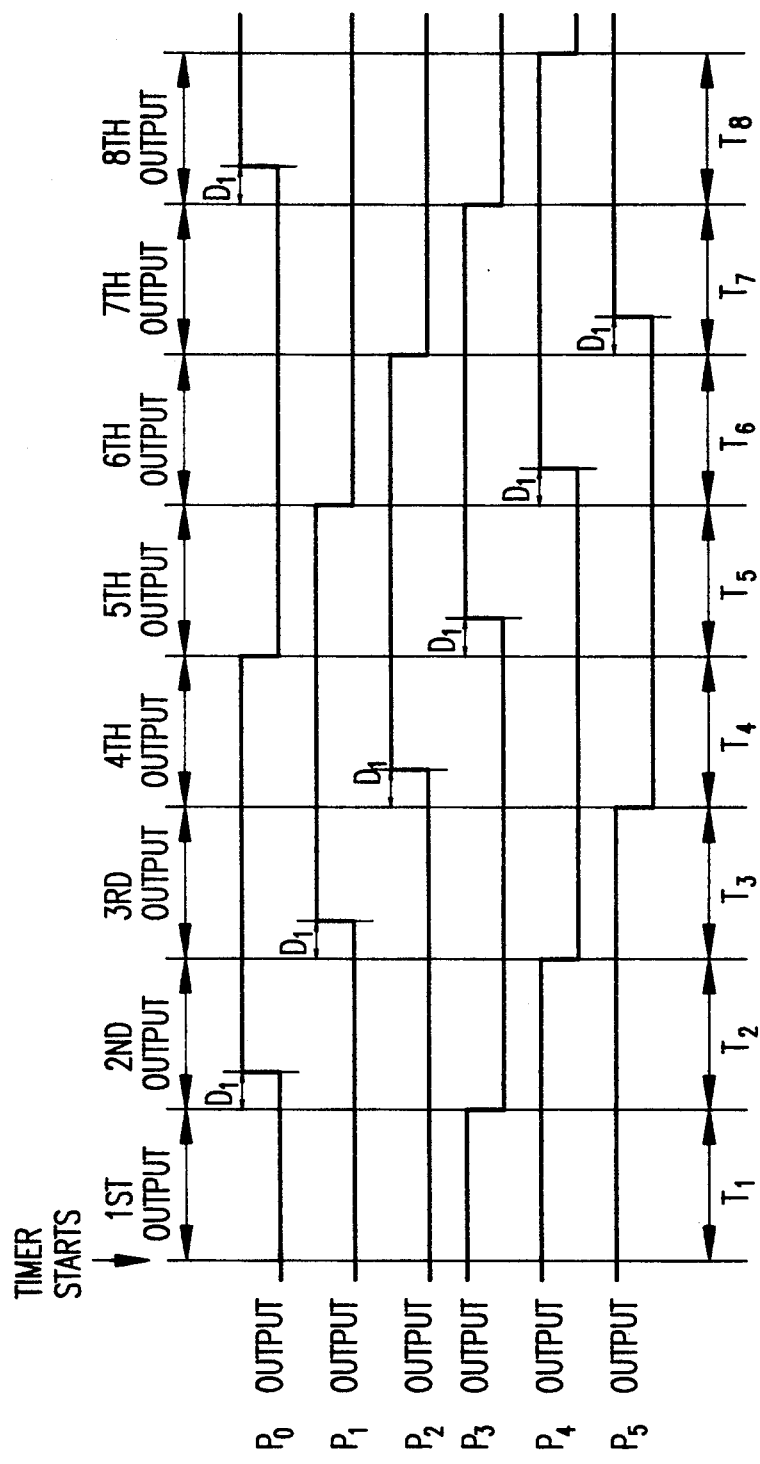

Next, a delayed output mode in which the values latched in the output latch circuit 105 are outputted to the output port 200 at a delayed timing, will be described with reference to FIG. 3.

Before the port output operation starts, the CPU 101 controls to the effect that output values to be outputted to the ports P0 to P5 at a first time ("000111" in the timing chart of FIG. 3) are previously set in the latch circuit 105, and output values to be outputted to the ports P0 to P5 at a second time ("100011" in the timing chart of FIG. 2) are previously set in the buffer register 104. Therefore, at this time, similarly to the undelayed output mode, the output values to be outputted at the first time set in the output latch circuit 105 are being outputted to the ports P0 to P5. In addition, the compare register 107 previously set with a value corresponding to a period of time (T1 in the timing chart of FIG. 3) in which the output values to be outputted to the ports P0 to P5 at the first time continue to be outputted to the ports P0 to P5. A value corresponding to a delay time (D1 in the timing chart of FIG. 3) given when the port output is changed from "0" to "1", is also previously set in the delay designation register 116. Furthermore, the delay designating bit DLY 114 is set to "1" to designate the delayed output mode, so that all of the transfer gates 160, 161, 162, 163, 164 and 165 are closed and all of the transfer gates 150, 151, 152, 153, 154 and 155 are open, so as to ensure that the values latched in the output latch circuit 105 are outputted to the output port 200 through the flipflops 120 to 125.

Thereafter, the timer counter start bit ST 108 is set to "1", so that the timer counter 106 is caused to start its counting operation.

Similarly to the undelayed output mode, if the timer counter start bit ST 108 is set to "1", the timer counter 106 is cleared to "0" and thereafter, the timer counter 106 is incremented by "1" in response to a rising edge of each internal clock CLK. The comparator 111 ceaselessly compares the value of the timer counter 106 with the value previously set in the compare register 107. As a result of the increment of the timer counter 106, if the value of the timer counter 106 becomes consistent with the value previously set in the compare register 107, the comparator 111 activates the coincidence signal 109.

If the coincidence signal 109 is activated, the value of each of the bits 1040 to 1045 of the buffer register 104 is latched to a corresponding one of the latches 1050 to 1055 of the output latch circuit 105. Since the buffer register 104 is previously set with the output values to be outputted to the ports P0 to P5 at the second time, the output values to be outputted at the second time are latched into the output latch circuit 105. At the same time, in response to activation of the coincidence signal 109, the value of the delay designation register 116 is preset to the delay counter 115, and the delay counter 115 starts its counting operation in which the delay counter 115 is decremented by "1" in response to a rising edge of each internal clock CLK. When the value of the delay counter 115 becomes "0" as a result of the decrementing operation, the delay counter 115 generates an active coincidence signal 117 in the form of a one-shot pulse, and stops its counting operation.

Here, as an example, an operation of outputting to the port P2 will be explained. As mentioned above, the latch "c" 1052 latches the output value to be outputted to the port P2 at the second time. If the value latched in the latch "c", 1052 is "0", the output value of the inverter 132 becomes "1", which resets the set/reset flipflop 122. Since the delay designation bit DLY 114 is previously set with "1" as mentioned above, and therefore, since the transfer gate 152 is open, the output Q of the flipflop 122 is selected and "0" is outputted to the port P2.

On the other hand, if the value latched in the latch "c" 1052 is "1", "1" is supplied to the one input of the AND gate 142. However, the output of the AND gate 142 is maintained at "0" until the other input of the AND gate 142 is brought to "1". As mentioned above, when the counting of the delay period by the delay counter 115 is completed, the coincidence signal 117 is activated to "1". Therefore, when the counting of the delay period by the delay counter 115 is completed, the output of the AND gate 142 is brought to "1", so that the flipflop 122 is set. Since the delay designation bit DLY 114 is previously set with "1" and the transfer gate 152 is open, the set value of the flipflop 122 is selected and "1" is outputted to the port P2.

In the other bits, an operation similar to the above operation is performed. If the value stored in the latch is "0", "0" is outputted to the corresponding port just after "0" is latched in the latch. On the other hand, if the value stored in the latch is "1", "1" is outputted to the corresponding port with a delay time has elapsed after "0" is latched in the latch.

Furthermore, the coincidence signal 109 is supplied as a timer interrupt request signal 113 to the interrupt controller 110. If the interrupt controller 110 detects the activated timer interrupt request signal 113, the interrupt controller 110 outputs an active interrupt request signal 112 to the CPU 101.

If the CPU 101 detects the active interrupt request signal 112, the CPU 101 interrupts a programmed processing being executed, and starts an interrupt program processing. In this interrupt routine, output values to be outputted to the ports P0 to P5 at a third time ("110001" in the timing chart of FIG. 3) are set in the buffer register 104, and the compare register 107 is set with a value corresponding to a period of time (T2 in the timing chart of FIG. 3) in which the output values to be outputted at the second time continue to be outputted to the ports P0 to P5.

As mentioned above, the value set in the compare register 107 by the CPU 101 is compared again with the value of the timer counter 106 by the comparator 111. When the period of time (T2 in the timing chart of FIG. 3) for continuing to output the output values to be outputted at the second time has elapsed, the comparator 111 detects coincidence between the value set in the compare register 107 and the value of the timer counter 106, and an operation similar to that performed when the coincidence detection is made for the output values to be outputted at the first time will be performed.

The above mentioned operation is repeatedly performed, so that, if the output value to be outputted to the port is "1", the timing of outputting to the port is delayed, and the value outputted to the port is changed every arbitrary period of time.

Figure 4:
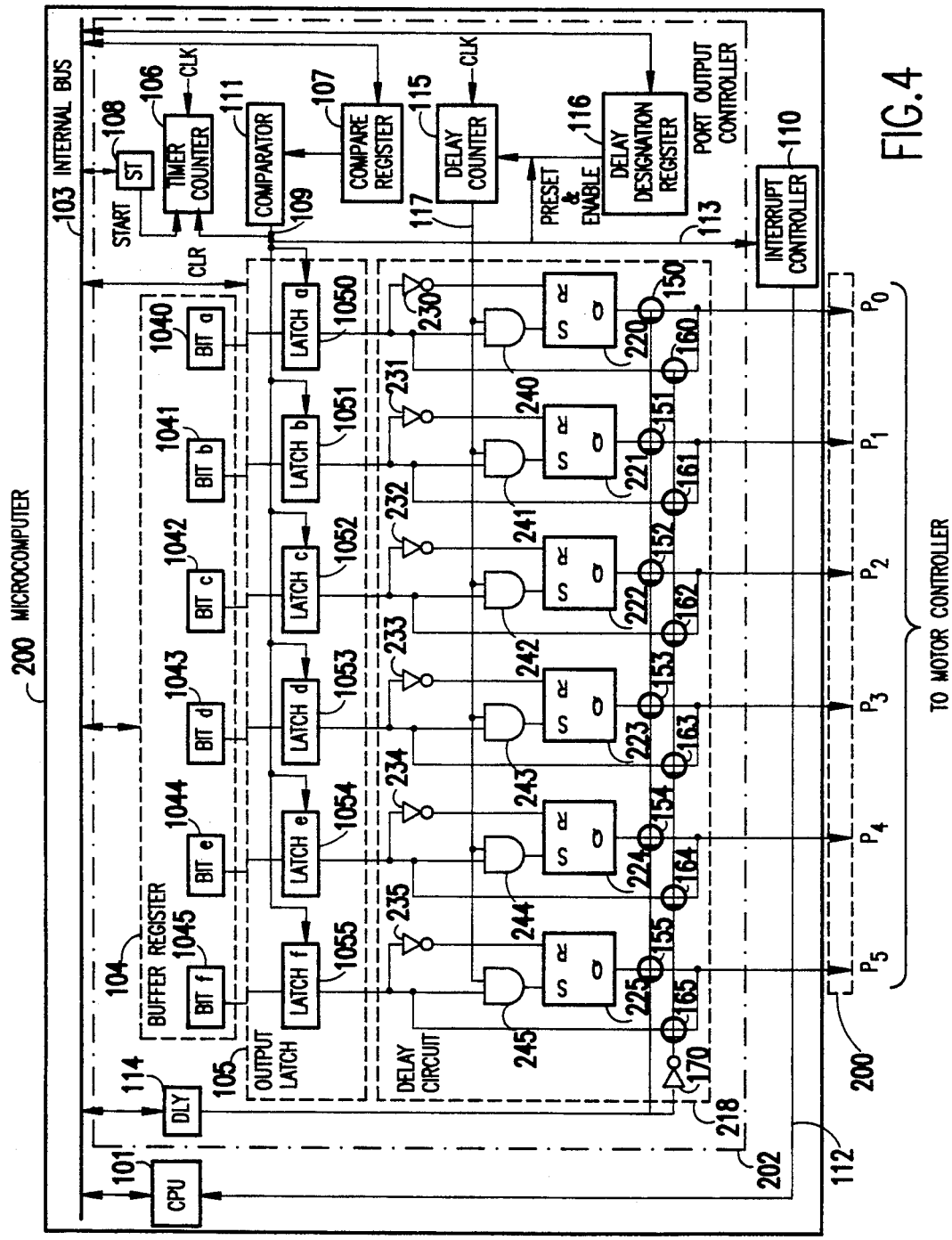
FIG. 4 is a block diagram of the microcomputer having a second embodiment of the port output controller in accordance with the present invention.
Figure 5:
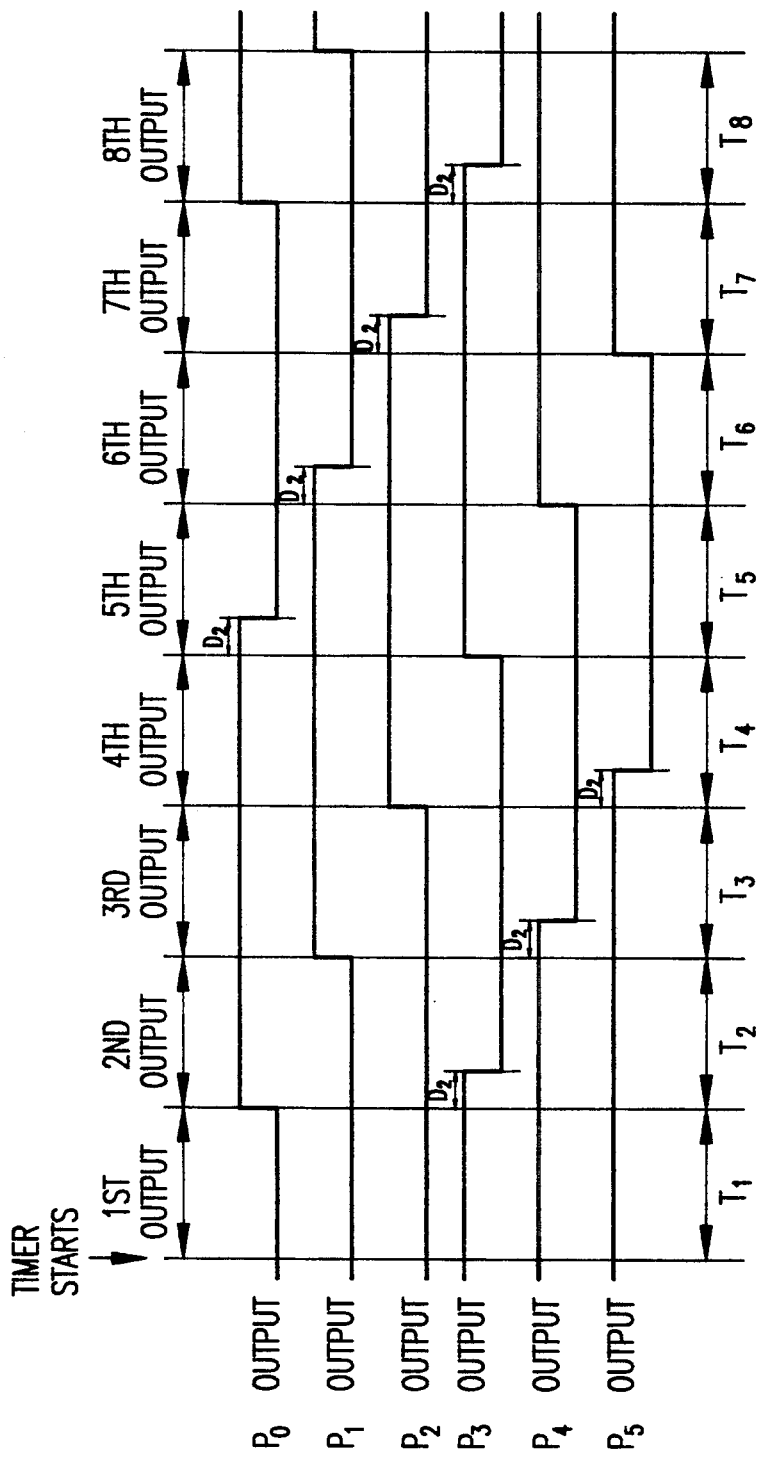
FIG. 5 is a timing chart illustrating an operation of the port output controller shown in FIG. 4.

Referring to FIG. 4, there is shown a block diagram of the microcomputer having a second embodiment of the port output controller in accordance with the present invention. FIG. 5 shows a timing chart illustrating an operation of the delayed output mode of the port output controller shown in FIG. 4. In FIGS. 4 and 5, elements similar to those shown in FIGS. 1 to 3 are given the same Reference Numerals.

As seen from comparison between FIGS. 1 and 4, the second embodiment has substantially the same construction as that of the first embodiment, excluding a portion of a delay circuit 218 included in a port output controller 202. Namely, the delay circuit 218 is configured so as to delay the timing of outputting to the port when the value of the latches 1050 to 1055 of the output latch circuit 105 is "0". Namely, the output of each of the latches 1050 to 1055 is connected directly to a set input S of a corresponding one of set/reset flipflops 220 to 225, and also to an input of a corresponding one of inverters 230 to 235. An output of each of the inverters 230 to 235 is connected to one input of a corresponding one of AND gates 240 to 245, which are connected at its other input to receive the coincidence signal 117 from the delay counter 115. An output of each of the AND gates 240 to 245 is connected to a reset input R of a corresponding one of the set/reset flipflops 220 to 225.

Here, similarly to the first embodiment, an operation of outputting to the port P2 in the delayed output mode will be explained. In response to the coincidence signal 109 activated when the value of the timer counter 106 becomes coincident with the value of the compare register 107, the latch "c" 1052 latches the value of the bit "c" 1042 of the buffer register 104.

If the value latched in the latch "c" 1052 is "1", the set/reset flipflop 122 is set. Since the delay designation bit DLY 114 is previously set with "1", the transfer gate 152 is open, and therefore, the set output Q of the flipflop 122 is selected and "1" is outputted to the port P2.

On the other hand, if the value latched in the latch "c" 1052 is "0", the output of the inverter 232 becomes "1", which is supplied to the one input of the AND gate 142. However, the output of the AND gate 142 is maintained at "0" until the other input of the AND gate 142 is brought to "1". Similarly to the first embodiment, the delay counter 115 counts the delay time. When the counting of the delay period by the delay counter 115 is completed, the coincidence signal 117 is activated to "1". Therefore, when the counting of the delay period by the delay counter 115 is completed, since the output of the AND gate 142 is brought to "1", the flipflop 222 is reset. Since the delay designation bit DLY 114 is previously set with "1" and the transfer gate 152 is open, the reset value of the flipflop 222 is selected and "0" is outputted to the port P2.

In the other bits, an operation similar to the above operation of the port P2 is performed.

The above mentioned operation is repeatedly performed, so that, if the output value to be outputted to the port is "0", the timing of outputting to the port is delayed, and the value outputted to the port is changed every arbitrary period of time.

As seen from the above mentioned description of the embodiments, the microcomputer including the port output controller in accordance with the present invention is configured such that when a plurality of output values outputted to a corresponding number of ports are simultaneously changed, whether the output value is outputted to the corresponding port just after expiration of a designated output maintaining period of time or when a designated delay time has elapsed after expiration of the designated output maintaining period of time, is selected for each of the ports, dependently upon the value to be outputted to the port.

Therefore, when a port output waveform is used for an driving waveform of a three-phase inverter motor, each pair of opposing phases (the P0 output and the P3 output, the P1 output and the P4 output, and the P2 output and the P5 output) never simultaneously become "0" even for a momentary period (See FIG. 5). Therefore, a problem in a motor control such as a flowing of a pass-through current can be avoided.

Also in the case of controlling a reversible DC motor, the motor can be controlled without the problem in which the pass-through current flows because a pair of opposing phases momentarily simultaneously become "0".

Furthermore, in the control of a stepping motor, since each pair of opposing phases never simultaneously become "1" even for a momentary period (See FIG. 5), it possible to solve the problem of the stepping motor control in which vibration occurs in a driving magnetic force.

The invention has thus been shown and described with reference to the specific embodiments. However, it should be noted that the present invention is in no way limited to the details of the illustrated structures but changes and modifications may be made within the scope of the appended claims.

We claim:

1. A port output controller for use in a microcomputer for outputting data to a plurality of output terminals, comprising:

a plurality of output terminals for outputting data;

means for holding data being outputted to the output terminals;

means for storing next data to be outputted to the output terminals next, in turn, after the data being outputted to the output terminals;

means for measuring an elapsed time after the next data is stored in the data holding means and for writing the next data stored in the data storing means to the data holding means when the measured elapsed time becomes a first time value;

means for designating either a first mode in which after the data stored in the data storing means has been written to the data holding means, the data held in the data holding means is outputted to the output terminals without delay, or a second mode in which after the data stored in the data storing means has been written to the data holding means, the data held in the data holding means may be outputted to the output terminals after a delay time; and means for measuring a delayed time after the next data stored in the data storing means has been written to the data holding means and for controlling the outputting of the data held in the data holding means to the output terminals when the second mode is designated by the mode designating means, in such a manner that if the data written to the data holding means is a first value, the data held in the data holding means is outputted to the output terminal without delay, and if the data written to the data holding means is a second value, the data held in the data holding means is outputted to the output terminal when the measured delayed time has become a second time value.

2. The port output controller claimed in claim 1 wherein the means for controlling the outputting of the data held in the data holding means to the output terminals includes a delay logic circuit which, if the data written to the data holding means is "0", outputs the data held in the data holding means to the output terminal without delay, and if the data written to the data holding means is "1", outputs the data held in the data holding means to the output terminal when the measured delayed time has become the second time value.

3. A port output controller claimed in claim 1 wherein the means for controlling the outputting of the data held in the data holding means to the output terminals includes a delay logic circuit which if the data written to the data holding means is "1", outputs the data held in the data holding means to the output terminal without delay, and if the data written to the data holding means is "0", outputs the data held in the data holding means to the output terminal when the measured delayed time has become the second time value.

4. A port output controller for use in a microcomputer for outputting data to a plurality of output terminals, comprising a latch circuit means for latching data being outputted to the output terminals; a buffer register means for storing next data to be outputted to the output terminals next, in turn, after the data being outputted to the output terminals; a timer counter for counting an elapsed time after the next data has been latched in the latch circuit means and for latching the next data stored in the buffer register means in the latch circuit means when the counted elapsed time reaches a specified period of time; a delay counter for counting a delay time after the next data has been latched in the latch circuit means; and a delay output circuit means for controlling the outputting of the data latched in the latch circuit means to the output terminals in a delayed output mode, so that if the data latched in the latch circuit means is a first value, the data latched in the latch circuit means is outputted to the output terminal without delay, and if the data latched in the latch circuit means is a second value, the data latched in the latch circuit means is outputted to the output terminal when the counted delay time has reached said delay time.

* * * * *